United States Patent
Liu et al.

(10) Patent No.: US 11,347,640 B2
(45) Date of Patent: May 31, 2022

(54) DATA STORAGE DEVICE AND DATA PROCESSING METHOD

(71) Applicant: Silicon Motion, Inc., Hsinchu County (TW)

(72) Inventors: Yuan-Ping Liu, Hsinchu County (TW); Yi-Hua Li, Tainan (TW); Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/080,856

(22) Filed: Oct. 27, 2020

(65) Prior Publication Data
US 2021/0279170 A1 Sep. 9, 2021

(30) Foreign Application Priority Data

Mar. 9, 2020 (TW) .................................. 109107600

(51) Int. Cl.
*G06F 12/02* (2006.01)
*G06F 13/16* (2006.01)
*G06F 12/0811* (2016.01)
*G06F 12/0882* (2016.01)

(52) U.S. Cl.
CPC ...... *G06F 12/0246* (2013.01); *G06F 12/0811* (2013.01); *G06F 12/0882* (2013.01); *G06F 13/1668* (2013.01)

(58) Field of Classification Search
CPC ............. G06F 12/0246; G06F 13/1668; G06F 12/0811; G06F 12/0882

USPC ........................................................ 711/154
See application file for complete search history.

(56) References Cited

U.S. PATENT DOCUMENTS

| 8,825,941 B2 | 9/2014 | Moshayedi |
| 2012/0005415 A1* | 1/2012 | Jung ................... G06F 12/0246 711/103 |
| 2013/0086304 A1* | 4/2013 | Ogawa .................... G06F 3/064 711/103 |
| 2019/0354478 A1* | 11/2019 | Kashyap ................. G06F 3/064 |

FOREIGN PATENT DOCUMENTS

TW 201917581 A 5/2019

\* cited by examiner

*Primary Examiner* — Hua J Song
(74) *Attorney, Agent, or Firm* — Winston Hsu

(57) ABSTRACT

A data storage device includes a memory device and a memory controller. The memory controller is arranged to configure a plurality of first memory blocks to receive data from a host device. The first memory blocks form at least a first superblock. When an amount of data stored in the first memory blocks reaches a specific value, the memory controller moves the data from the first memory blocks to a plurality of second memory blocks in a predetermined procedure. The second memory blocks form at least a second superblock. The second superblock includes the second memory blocks located in different memory chips. The data stored in two adjacent logical pages in the first superblock is written in two second memory blocks located in different memory chips.

13 Claims, 10 Drawing Sheets

DATA STORAGE DEVICE AND DATA PROCESSING METHOD

BACKGROUND OF THE INVENTION

1. Field of the Invention

The invention relates to a data processing method capable of improving access efficiency of the memory device and the associated data storage device utilizing the data processing method.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

Generally, the read/write operation of a memory device must experience a busy period. After a read/write command has been issued to the memory device, the memory controller must wait for the end of the busy period of the memory device and then issue the next read/write command to the memory device for other operations. Therefore, the access efficiency of the memory device will be limited.

SUMMARY OF THE INVENTION

As discussed above, the access efficiency of the memory device will be affected since memory controller must wait for the end of the busy period of the memory device and cannot issue another command to the same memory device until the busy period of the memory device is ended.

It is an objective of the invention to solve the problem that interleaved reading (or, read interleaving) cannot be performed due to the arrangement of the data. In the embodiments of the invention, by changing the order of the data read from the source superblock (the source data) or by adequately arranging the page addresses of the destination superblock, the data stored in the destination superblock will be arranged in the order which facilitates the memory controller 110 being able to read the data in the way of read interleaving in the future. Via the interleaved reading, the access efficient of the data storage device can be effectively improved.

According to an embodiment of the invention, a data storage device comprises a memory device and a memory controller. The memory device comprises a plurality of memory chips and each memory chip comprises a plurality of memory blocks. The memory controller is coupled to the memory device and arranged to access the memory device. The memory controller is further arranged to configure a plurality of first memory block to receive data from a host device, the first memory blocks form at least a first superblock. The first superblock comprises a first predetermined number of first memory blocks located in different memory chips. When an amount of data stored in the first memory blocks reaches a specific value, the memory controller is arranged to move the data from the first memory blocks to a plurality of second memory blocks in a predetermined procedure. The second memory blocks form at least a second superblock and the second superblock comprises a second predetermined number of second memory blocks located in different memory chips. In the predetermined procedure, the data stored in the first memory blocks is sequentially written into the second memory blocks, and the data stored in two adjacent logical pages in the first superblock is written in two second memory blocks located in different memory chips.

According to another embodiment of the invention, a data processing method for a memory device comprising a plurality of memory chips and each memory chip comprising a plurality of memory blocks comprises: configuring a plurality of first memory blocks to receive data from a host device, wherein the first memory blocks form at least a first superblock and the first superblock comprises a first predetermined number of first memory blocks located in different memory chips; and when an amount of data stored in the first memory blocks reaches a specific value, moving the data from the first memory blocks to a plurality of second memory blocks in a predetermined procedure, wherein the second memory blocks form at least a second superblock and the second superblock comprises a second predetermined number of second memory blocks located in different memory chips, and wherein the data stored in two logical pages in the first superblock with consecutive page addresses is written in two second memory blocks located in different memory chips.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
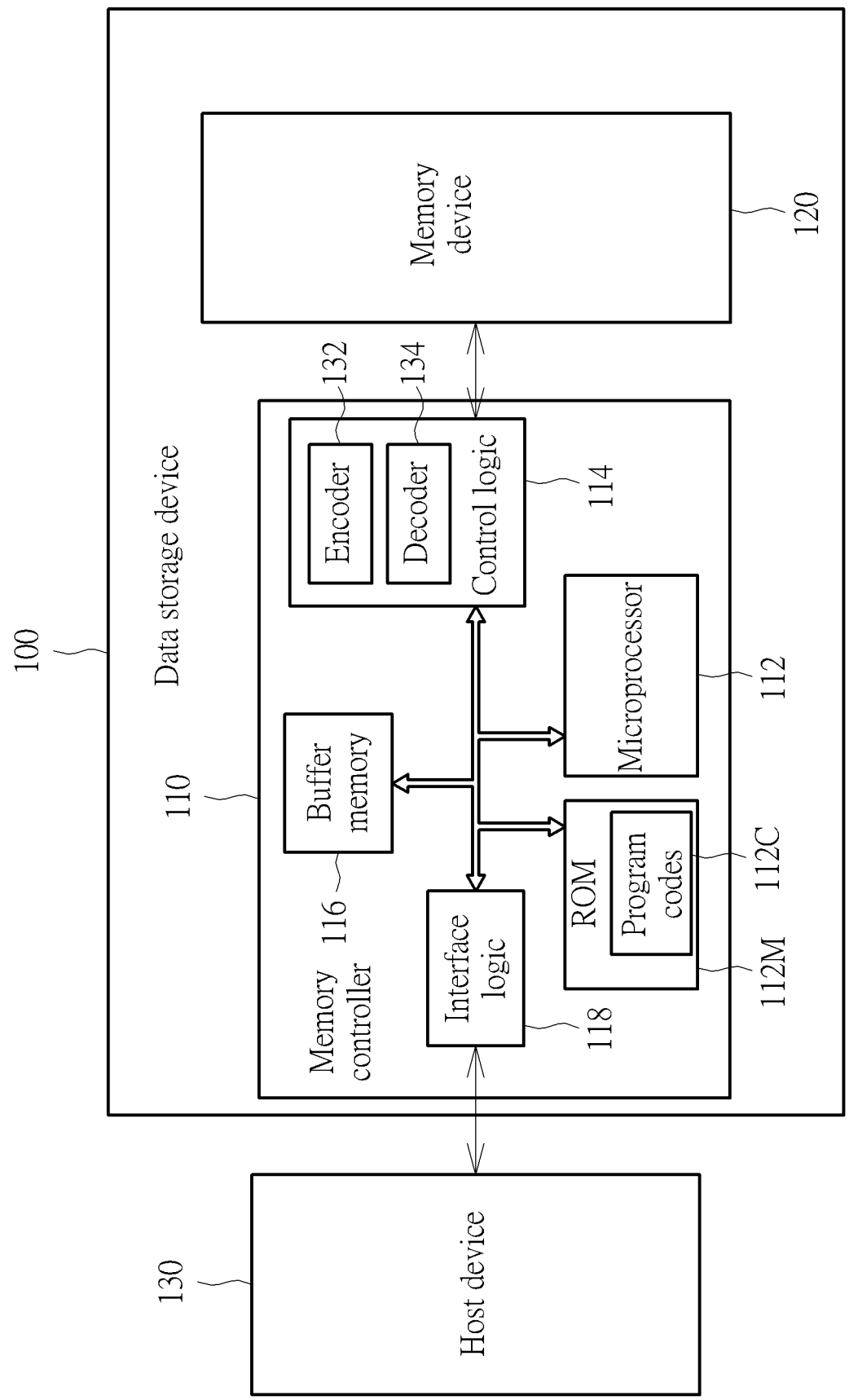
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages. For example, all the floating-gate transistors or other charge trap elements on a word line (not shown in figures) form at least one page, that is, one physical page. The access unit of a write operation performed by the controller (e.g., the memory controller 110, through the execution of the program codes 112C by the microprocessor 112) on the memory device 120 may be one page.

In practice, the memory controller 110 may perform various control operations using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the MMC interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks, the Triple-Level Cell (TLC) memory blocks and/or the Quad-Level Cell (QLC) memory blocks. Each memory unit of the SLC memory block is configured to store one bit data, each memory unit of the MLC memory block is configured to store two bits data, each memory unit of the TLC memory block is configured to store three bits data, and each memory unit of the TLC memory block is configured to store four bits data.

Generally, the memory device 120 may be divided into three regions, comprising a system region, a data region and a spare region. The memory controller 110 is configured to select one or more memory block from the spare region as a cache memory, or called a data buffer, to receive data and buffer the data. When the amount of data stored in the data buffer reaches a specific value (for example, when the data buffer is full or is almost full), the memory controller 110 may further update the memory block currently being utilized as a data buffer as a data block in the data region. For example, when the memory block currently being utilized as a data buffer to receive data is an MLC, a TLC or a QLC memory block and when the memory block is full, the memory block may be directly updated as a data block in the data region. When the memory block currently being utilized as a data buffer to receive data is an SLC memory block, when a predetermined number of such memory blocks are full, the memory controller may perform a garbage collection procedure to move the data stored in the SLC memory blocks (the source memory blocks) to an MLC, a TLC or a QLC memory block (the destination memory block) and update the destination memory block as a data block in the data region.

To improve access performance, the flash memory chips (or called memory dies or logical unit number (LUN)) (depending on the type of packaging method utilized for packaging the memory device, different names or different forms may be presented) of the memory device 120 may share the same data bus. That is, the flash memory chips of the memory device 120 may be coupled to the memory controller 10 through the shared data bus. It should be noted that the invention is not limited to configuring multiple flash memory chips coupled to the memory controller 110 through the share data bus. The invention may also include configuring multiple flash memory dies or LUNs coupled to the memory controller 110 through the share data bus. However, to simplify the description, the memory chip will be taken as the example for explanation in the following paragraphs. In addition, it should be noted that each of the aforementioned chips, dies or LUNs sharing the data bus may have its own internal buffer, and may respectively maintain operation status by itself.

In operation, the memory controller 110 may sequentially enable the memory chips, and may sequentially transmit commends to the corresponding memory chips (noted that only the enabled memory chip receives the command) via the shared data bus, thereby allowing the memory chips to perform read/write operation in parallel. Via the overlapped read/write operations on the timeline, the access efficient of the data storage device can be effectively improved.

Figure 2:
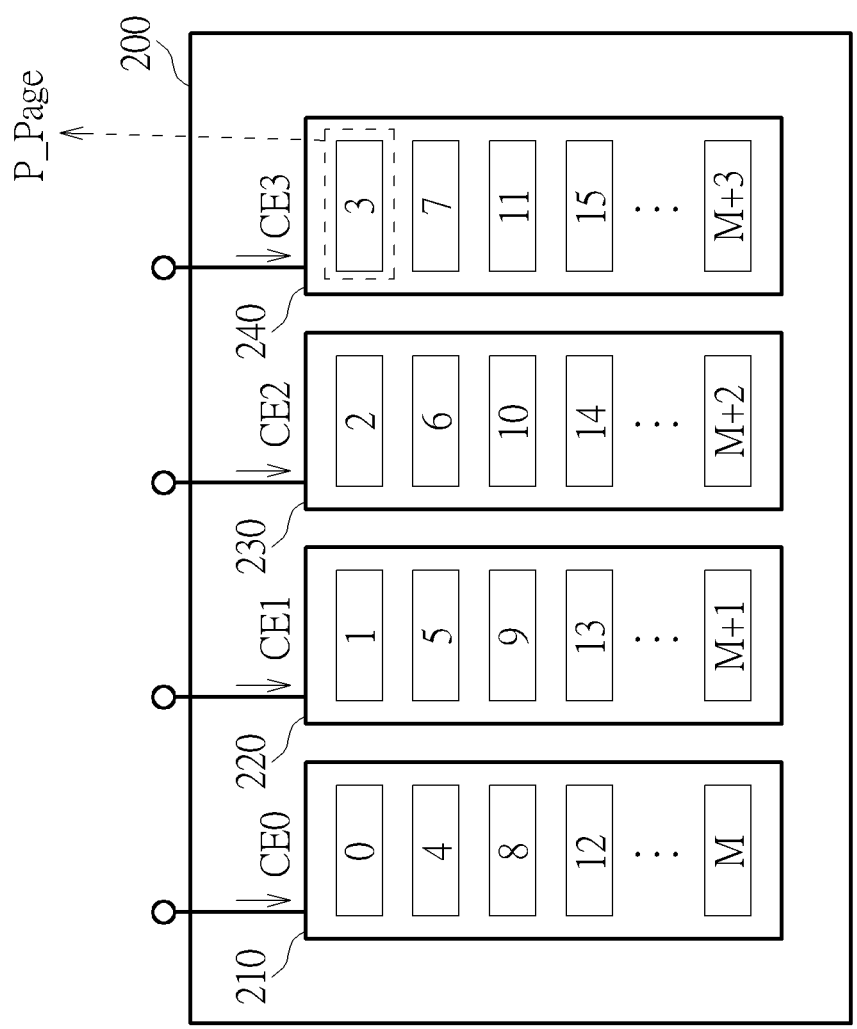
FIG. 2 shows the structure of an SLC superblock according to an embodiment of the invention.

FIG. 2 shows the structure of an SLC superblock according to an embodiment of the invention. In this embodiment, four SLC memory blocks located in different memory chips form an SLC superblock, wherein these four SLC memory blocks forming one SLC superblock may have the same memory block number or memory block index in the corresponding memory chip.

As shown in FIG. 2, the SLC superblock 200 may be formed by the SLC memory blocks 210, 220, 230 and 240, and the SLC memory blocks 210, 220, 230 and 240 located in different memory chips may all be, for example, the first memory block in the corresponding memory chips. The memory controller 110 may use different chip enable signals to enable the corresponding memory chips. For example, the memory controller 110 may respectively use the chip enable signals CE0, CE1, CE3 and CE3 to enable the corresponding memory chips of the SLC memory blocks 210, 220, 230 and 240.

Each SLC memory block may be utilized to store the data corresponding to a plurality logical pages and one physical page P_Page in the SLC memory block may correspond to one logical page.

Suppose that the memory controller 110 may sequentially recognize the SLC memory blocks 210, 220, 230 and 240 shown in FIG. 2 as the first SLC memory block, the second SLC memory block, the third SLC memory block and the fourth SLC memory block comprised in the SLC superblock 200, the memory controller 110 may assign a corresponding index in a cyclic manner to each logical page in the SLC superblock 200 as the default page index thereof.

For example, the value of the index idx=0 may be assigned to the first page of the first SLC memory block, the value of the index idx=1 may be assigned to the first page of the second SLC memory block, the value of the index idx=2 may be assigned to the first page of the third SLC memory block, the value of the index idx=3 may be assigned to the first page of the fourth SLC memory block, and then the value of the index idx=4 may be assigned to the second page of the first SLC memory block, the value of the index idx=5 may be assigned to the second page of the second SLC memory block, and the rest may be deduced by analogy. That is, the memory controller 110 may sequentially assign an index to the logical pages corresponding to the first, second, third and fourth SLC memory block in a cyclic manner along the direction where the internal physical page index of each SLC memory block is increasing.

In compliance with the rule as discussed above, the value of the index of the j-th page in the i-th SLC memory block in the SLC superblock 200 may be derived as $idx=(i-1)+4*(j-1)$, where $i=1\sim I$ and I is the number of memory blocks comprised in one superblock, $j=1\sim J$ and J is the number of pages comprised in a memory block. In this embodiment, $I=4$.

According to an embodiment of the invention, beside the values of the default page index, the memory controller 110 may further assign page addresses to the logical pages of a superblock according to a first rule (that is, the memory controller 110 may determine the sequence of the page addresses of the SLC superblock 200 according to the first rule). For example, the memory controller may sequentially assign a corresponding page address to a logical page of the first SLC memory block, the second SLC memory block, the third SLC memory block and the fourth SLC memory block by increasing the page address with reference to the values of the default page index, such that each logical page of the SLC superblock 200 is assigned a corresponding page address, which is an unique page address, and the page addresses of the SLC superblock 200 are arranged (that is, the order or arrangement of the page addresses, or the sequence of page addresses recognized by the memory controller 110) in a first order.

As shown in FIG. 2, each SLC memory block comprises a plurality of logical pages, wherein one physical page P_page of an SLC memory block corresponds to one logical page. Each logical page is marked with a number, which is the corresponding page address Page_add of that logical page. In this embodiment, the memory controller 110 sequentially assigns, in an ascending manner, page address Page_add=0 to the first page of the first SLC memory block, page address Page_add=1 to the first page of the second SLC memory block, page address Page_add=2 to the first page of the third SLC memory block, page address Page_add=3 to the first page of the fourth SLC memory block, page address Page_add=4 to the second page of the first SLC memory block, page address Page_add=5 to the second page of the second SLC memory block, and so on.

Therefore, in this embodiment, the aforementioned first rule is to assign the page addresses based on the default page indices, and the first order is the same as the order of the default page indices. That is, as the value of the default page index increases, the page address increases as well and is assigned to the corresponding logical page.

Since the arrangement of the page addresses of the SLC superblock 200 complies with the first rule, the memory controller 110 may sequentially write data to the corresponding logical pages based on the first order in the write operation. As discussed above, since the flash memory chips of the memory device 120 may be coupled to the memory controller 10 through the shared data bus, the memory chips may perform read/write operation in parallel. Via the overlapped read/write operations on the timeline, the access efficient of the data storage device can be effectively improved.

Figure 3:
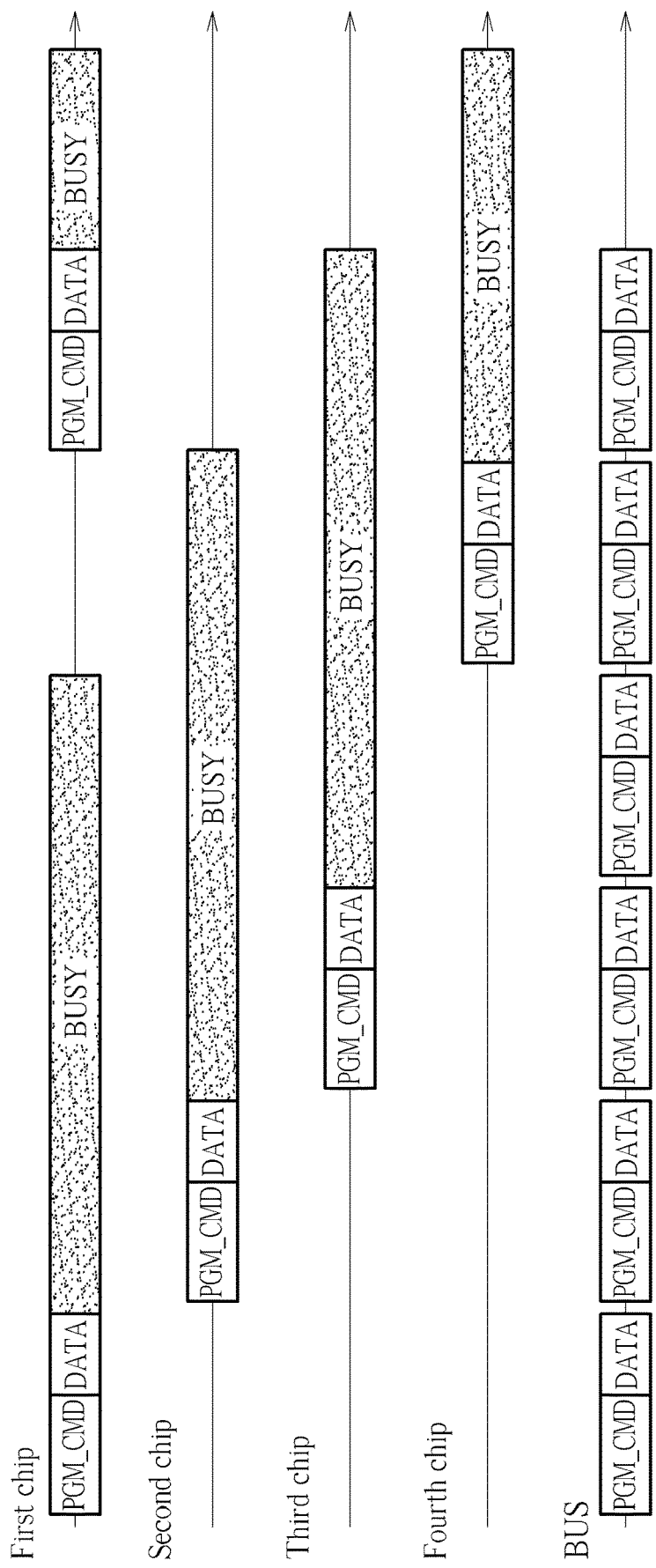
FIG. 3 is a timing diagram showing the write interleaving of the flash memory device in a single channel structure according to an embodiment of the invention.

FIG. 3 is a timing diagram showing the write interleaving of the flash memory device in a single channel structure according to an embodiment of the invention. In FIG. 3, the timing of writing data to a superblock is shown. In this embodiment, four memory blocks located in different flash memory chips (in this example called first chip, second chip, third chip and fourth chip) form a superblock. The first chip, the second chip, the third chip and the fourth chip may be coupled to the memory controller 110 through the shared data bus BUS. The write operations of the first chip, the second chip, the third chip and the fourth chip are respectively shown in FIG. 3, wherein the time interval labeled PGM_CMD represents the time interval during which the memory controller 110 issues a write command through the data bus BUS to the corresponding chip to inform the corresponding chip that the memory controller 110 wants to write data, the time interval labeled DATA represents the time interval during which the memory controller 110 provides the data to be written to the corresponding chip through the data bus BUS, and the time interval labeled BUSY represents the time interval during which the corresponding chip is busy in performing the data write operations. Since the write commands and the data are both provided to the corresponding chips through the data bus BUS, the commands and data actually transmitted on the data bus BUS are also shown on the bottom line in FIG. 3. As shown in FIG. 3, by configuring the superblock, the first chip, the second chip, the third chip and the fourth chip may perform the write operation in parallel. Therefore, during the time interval when one chip is busy in writing data, the memory controller 110 may still issue another command to another chip, and there is no need to wait for the end of the busy period of the memory chips, thereby greatly improving the access efficiency of the memory device.

Figure 4:
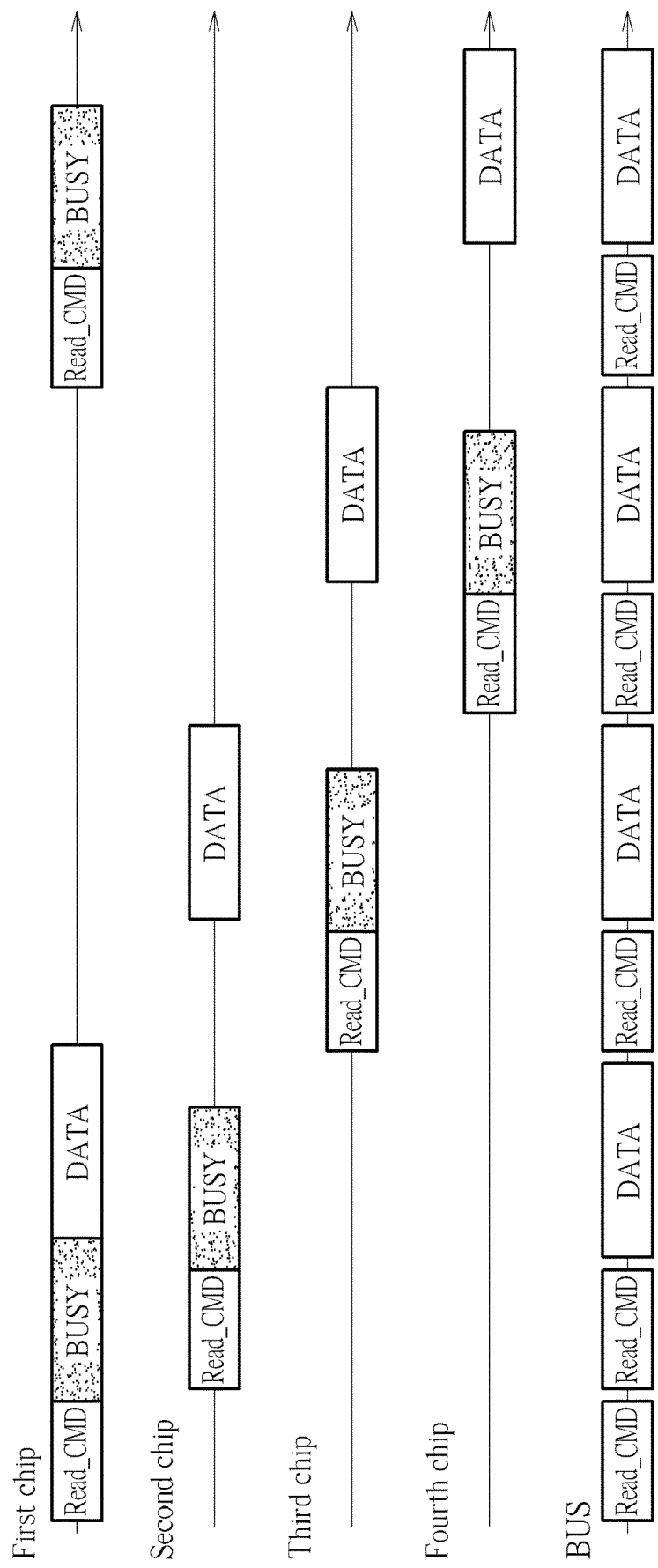
FIG. 4 is a timing diagram showing the read interleaving of the flash memory device in a single channel structure according to an embodiment of the invention.

FIG. 4 is a timing diagram showing the read interleaving of the flash memory device in a single channel structure according to an embodiment of the invention. Similarly, in this embodiment, four memory blocks located in different flash memory chips (in this example called first chip, second chip, third chip and fourth chip) form a superblock. The read operations of the first chip, the second chip, the third chip and the fourth chip are respectively shown in FIG. 4, wherein the time interval labeled Read_CMD represents the time interval during which the memory controller 110 issues a read command through the data bus BUS to the corresponding chip to inform the corresponding chip that the memory controller 110 wants to read data, the time interval labeled BUSY represents the time interval during which the corresponding chip is preparing the data that the memory controller 110 wants to read. For example, the corresponding chip may retrieve the data according to the read address and store the retrieved data in its internal buffer. Therefore, during this time interval, the memory chip is busy. The time interval labeled DATA represents the time interval during which the corresponding chip is providing the data to the memory controller 110 through the data bus BUS. Since the read commands and the data are both provided through the data bus BUS, the commands and data actually transmitted on the data bus BUS are also shown on the bottom line in FIG. 4. As shown in FIG. 4, by configuring the superblock, the first chip, the second chip, the third chip and the fourth chip may perform the read operation in parallel. Therefore, during the time interval when one chip is busy in reading data, the memory controller 110 may still issue another command to another chip, and there is no need to wait for the end of the busy period of the memory chips, thereby greatly improving the access efficiency of the memory device.

According to an embodiment of the invention, the memory controller 110 may configure an SLC superblock such as the SLC superblock 200 shown in FIG. 2 as the data buffer to receive data from the host device 130, and may sequentially write data to the corresponding logical pages 0~(M+3) of the SLC superblock 200 in a write interleaving manner as shown in FIG. 3 based on the sequence of page addresses which are arranged in an ascending manner as shown in FIG. 2.

Since the storage capacity of the SLC memory block is not as good as other multi-level cell memory blocks, when the amount of data stored in the SLC memory block utilized as the data buffer reaches a specific value, for example, when the SLC memory block currently utilized as the data buffer is full, or when the amount of data stored in the SLC memory block reaches 90%, 95%, 97%, or the likes of the size of the SLC memory block, the memory controller 110 may determine to move the data from the SLC memory block to other memory block, such as the MLC, TLC or QLC memory block (hereinafter called the destination memory block), in a predetermined procedure. For example, the memory controller 110 may read the data from the SLC memory block and sequentially write the data in the logical pages of the destination memory block in a garbage collection procedure.

In order to clarify the concept of the invention and simplify the description, the TLC memory blocks are taken as the exemplary destination memory blocks in the following embodiments. However, it should be noted that the invention is not limited to moving data from the SLC memory block to the TLC memory block, and may be applied in moving data from the SLC memory block to the MLC memory block or QLC memory block, or moving data from the MLC memory block to the TLC memory block or the QLC memory block, or moving data from the TLC memory block to the TLC memory block or QLC memory block, etc.

In other words, the proposed data processing method may be implemented in any type of applications in which the number of data bits stored in a memory unit of the destination memory blocks is greater than or equal to the number of data bits stored in a memory unit of the source memory blocks.

Figure 5:
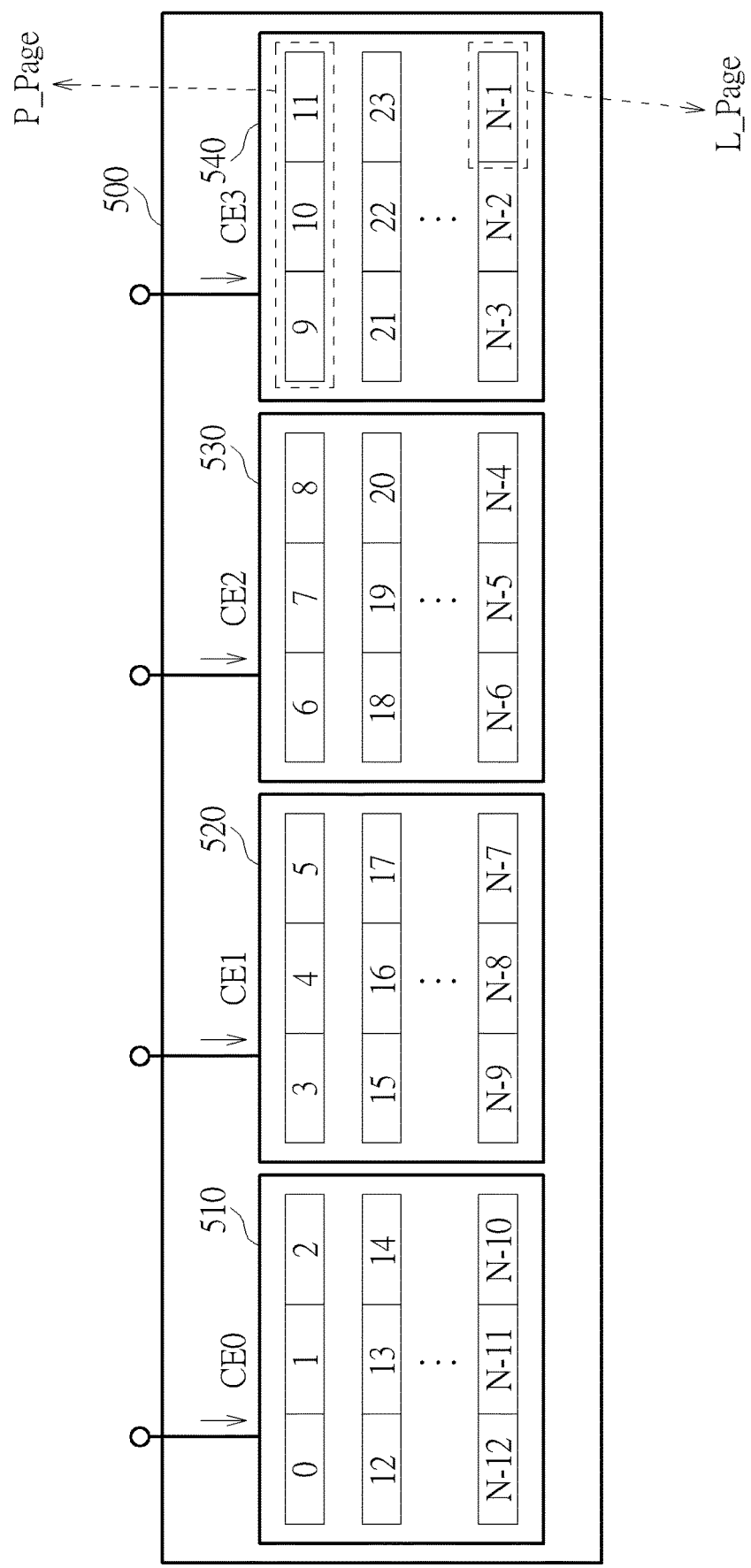
FIG. 5 shows an exemplary TLC superblock according to an embodiment of the invention.

FIG. 5 shows an exemplary TLC superblock according to an embodiment of the invention. In this embodiment, four TLC memory blocks located in different flash memory chips form a TLC superblock, wherein the four TLC memory blocks forming one TLC superblock may have the same memory block number or memory block index in the corresponding flash memory chip.

As shown in FIG. 5, the TLC superblock 500 may be formed by the TLC memory blocks 510, 520, 530 and 540, and the TLC memory blocks 510, 520, 530 and 540 located in different memory chips may all be, for example, the first memory block in the corresponding memory chips. The memory controller 110 may use different chip enable signals to enable the corresponding memory chips. For example, the memory controller 110 may respectively use the chip enable signals CE0, CE1, CE3 and CE3 to enable the memory chips corresponding to the TLC memory blocks 510, 520, 530 and 540.

Each TLC memory block may be utilized to store the data corresponding to a plurality logical pages and one physical page P_Page in the TLC memory block may correspond to three logical pages L_Page.

Suppose that the memory controller 110 may sequentially recognize the TLC memory blocks 510, 520, 530 and 540 shown in FIG. 5 as the first TLC memory block, the second TLC memory block, the third TLC memory block and the fourth TLC memory block comprised in the TLC superblock 500, the memory controller 110 may also assign a corresponding index in a cyclic manner to each logical page in the TLC superblock 500 as the default page index thereof.

For example, the value of the index idx=0 may be assigned to the first logical page of the first physical page the first TLC memory block, the value of the index idx=1 may be assigned to the second logical page of the first physical page the first TLC memory block, the value of the index idx=2 may be assigned to the third logical page of the first physical page the first TLC memory block, the value of the index idx=3 may be assigned to the first logical page of the first physical page the second TLC memory block, the value of the index idx=4 may be assigned to the second logical page of the first physical page the second TLC memory block, the value of the index idx=5 may be assigned to the third logical page of the first physical page the second TLC memory block, the value of the index idx=6 may be assigned to the first logical page of the first physical page the third TLC memory block, the value of the index idx=7 may be assigned to the second logical page of the first physical page the third TLC memory block, the value of the index idx=8 may be assigned to the third logical page of the first physical page the third TLC memory block, the value of the index idx=9 may be assigned to the first logical page of the first physical page the fourth TLC memory block, the value of the index idx=10 may be assigned to the second logical page of the first physical page the fourth TLC memory block, the value of the index idx=11 may be assigned to the third logical page of the first physical page the fourth TLC memory block, and the rest may be deduced by analogy. That is, the memory controller 110 may sequentially assign an index to the first, second and third logical pages of each physical page corresponding to the first, second, third and fourth TLC memory block in a cyclic manner along the direction where the internal physical page index of each TLC memory block is increasing.

In compliance with the rule as discussed above, the value of the index of the z-th logical page of the y-th physical page in the x-th TLC memory block may be derived as idx=3*(x−1)+12*(y−1)+(z−1), where x=1~X and X is the number of memory blocks comprised in one superblock, y=1~Y and Y is the number of physical pages comprised in one memory block, z=1~Z and Z is the number of logical pages comprised in one physical page. In this embodiment, X=4 and Z=3.

As discussed above, beside the values of the default page index, the memory controller 110 may further assign page addresses to the logical pages of a superblock.

According to a first embodiment of the invention, the memory controller 110 may assign the page addresses to the logical pages corresponding to the TLC superblock 500 according to a second rule (that is, the memory controller 110 may determine the sequence of the page addresses of the TLC superblock 500 according to the second rule). For example, the memory controller may sequentially assign a corresponding page address to a logical page of the first TLC memory block, the second TLC memory block, the third TLC memory block and the fourth TLC memory block by increasing the page address with reference to the values of the default page index, such that each logical page of the TLC superblock 500 is assigned a corresponding page address, which is an unique page address, and the page addresses of the TLC superblock 500 are arranged (that is, the order or arrangement of the page addresses, or the sequence of page addresses recognized by the memory controller 110) in a second order.

As shown in FIG. 5, each TLC memory block may comprise a plurality of logical pages L_Page. Each logical page is marked with a number, which is the corresponding page address Page_add of that logical page. In this embodiment, the memory controller 110 sequentially assigns, in an ascending manner, page address Page_add=0 to the first logical page of the first physical page of the first TLC memory block, page address Page_add=1 to the second logical page of the first physical page of the first TLC memory block, page address Page_add=2 to the third logical page of the first physical page of the first TLC memory block, page address Page_add=3 to the first logical page of the first physical page of the second TLC memory block, page address Page_add=4 to the second logical page of the first physical page of the second TLC memory block, page address Page_add=5 to the third logical page of the first physical page of the second TLC memory block, and so on.

Therefore, in the first embodiment of the invention, the aforementioned second rule is to assign the page addresses based on the default page indices, and the second order is the same as the order of the default page indices. That is, as the value of the default page index increases, the page address increases as well and is assigned to the corresponding logical page.

According to an embodiment of the invention, the memory controller 110 may configure the TLC superblock 500 as shown in FIG. 5 as the destination superblock to receive the data originally stored in the SLC memory blocks in the aforementioned predetermined procedure, wherein the memory blocks comprised in the TLC superblock 500 are the destination memory blocks in the predetermined procedure.

Referring to FIG. 2 and FIG. 5 together, since the page addresses of the SLC superblock 200 (the source superblock in the predetermined procedure) are arranged in compliance with the first rule, in the write operation, the memory block 110 may sequentially write the data in the corresponding logical pages according to the first order. In the read operation, the memory controller 110 may also read the data according to the first order. In this manner, the aforementioned write interleaving and read interleaving may be applied to improve the memory access efficiency.

However, it should be noted that in the aforementioned predetermined procedure, when the memory block 110 sequentially write the data that was read from the SLC superblock 200 to the corresponding logical pages of the TLC superblock 500 according to the second order (that is, the order that the page addresses are assigned to the TLC superblock 500 as shown in FIG. 5), the aforementioned read interleaving cannot be applied in the read operation to improve the memory access efficiency.

For example, suppose that the data SLC_P(k) represents the data read from the page in the SLC superblock 200 having the page address Page_add=k. When the memory controller 110 does not rearrange the data but just directly writes the data to the TLC superblock 500 based on the order of the data read from the SLC superblock 200, the first data SLC_P(0) stored in the SLC superblock 200 will be written in the first logical page of the first physical page of the first TLC memory block (since the assigned page address thereof is Page_add=0), the second data SLC_P(1) stored in the SLC superblock 200 will be written in the second logical page of the first physical page of the first TLC memory block (since the assigned page address thereof is Page_add=1), the third data SLC_P(2) stored in the SLC superblock 200 will be written in the third logical page of the first physical page of the first TLC memory block (since the assigned page address thereof is Page_add=2), and the rest may be deduced by analogy.

In this manner, when the memory controller 110 has to read the data SLC_P(0)~SLC_P(2), the memory controller 110 has to consecutively access the same memory chip (for example, the memory chip where the TLC memory block 510 is located). To be more specific, the memory controller 110 must wait for the end of the operation of reading the data SLC_P(0) and then issue another command to the same memory chip to request to read the data SLC_P(1) when the status of the memory chip to change from busy to not busy. Therefore, during the procedure of reading the data, the memory access efficiency cannot be improved by using the read interleaving method as discussed above. When the data buffered in the SLC superblock 200 is consecutive data and the memory controller 110 directly writes the data into the TLC superblock 500 based on the sequence of the page addresses of the TLC superblock 500 as shown in FIG. 5, the problem of aforementioned inefficient access performance occurs when the memory controller 110 has to read the consecutive data from the TLC superblock 500.

To solve this problem, according to an embodiment of the invention, when performing the aforementioned predetermined procedure, the memory controller 110 may write the data stored in (read from) two adjacent logical pages of the source superblock in two memory blocks located in different memory chips in the destination superblock. In the embodiments of the invention, the two adjacent logical pages means that the logical pages assigned with consecutive page addresses, such as 0 and 1, 1 and 2, 2 and 3, and so on.

In the first embodiment of the invention, when rule (for example, the second rule) for the memory controller 110 to assign the page addresses to the logical pages in the TLC superblock 500 (the destination superblock) is the same as the rule (for example, the first rule) for the memory controller 110 to assign the page addresses to the logical pages in the SLC superblock 200 (the source superblock), the memory controller 110 may sequentially write the data in the logical pages of the corresponding destination superblock according to a predetermined order, where the predetermined order is different from the order (for example, the aforementioned second order) of the page addresses of the destination superblock.

In other words, in the first embodiment of the invention, the first rule may be the same as the second rule, and the rule may be that the page addresses are arranged based on the default page indices, such that the page addresses are assigned to the corresponding logical pages in an ascending manner as the value of the default page index increases. However, when the second rule is the same as the first rule, the memory controller 110 does not write the data into the destination superblock in compliance with the sequence of the page addresses (or, the order or arrangement of the page addresses), such that the data stored in (read from) two adjacent logical pages of the source superblock will be written in two logical pages of two memory blocks located in different memory chips in the destination superblock.

For example, the memory controller 110 may read the data from the source superblock and buffer the data in the buffer memory 116. The memory controller 110 may further rearrange the data and write the data into the destination superblock. For another example, the memory controller 110 may read the data from the source superblock based on the order of the data that has to be finally presented in the destination superblock (for example, the aforementioned predetermined order) instead of reading the data from the source superblock based on the aforementioned first order.

Figure 6:
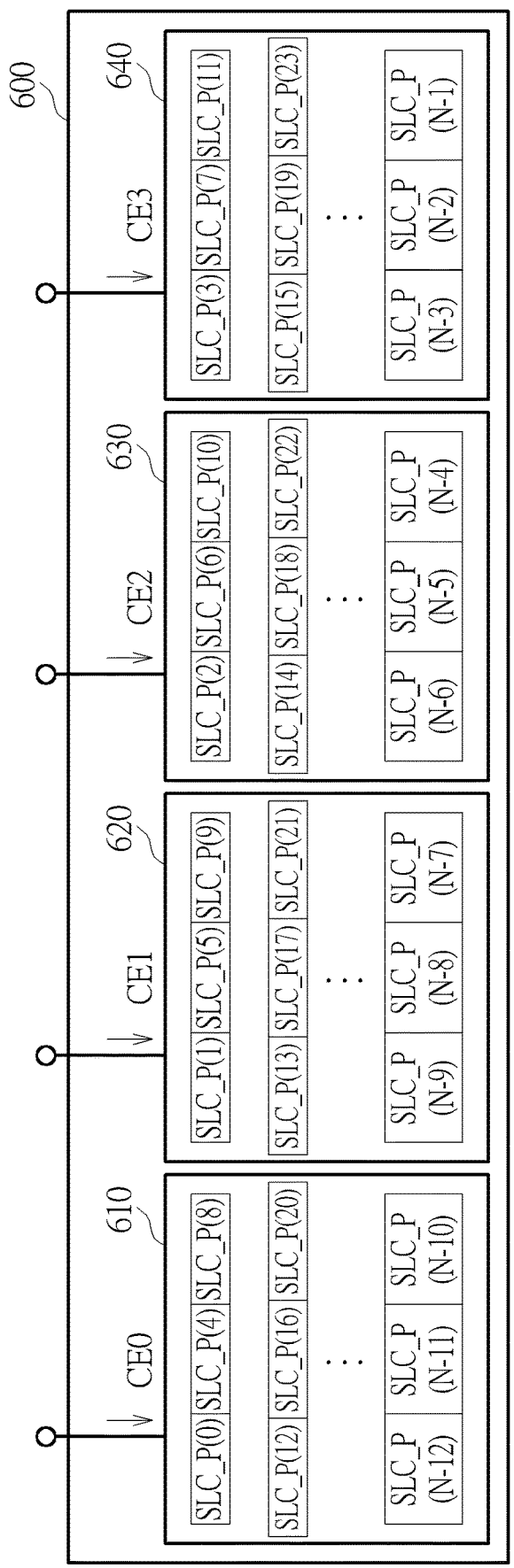
FIG. 6 is a schematic diagram showing an exemplary data arrangement in the destination superblock according to an embodiment of the invention.

FIG. 6 is a schematic diagram showing an exemplary data arrangement in the destination superblock according to an embodiment of the invention. In FIG. 6, the order of the data that has to be finally presented in the destination superblock is shown. In this embodiment, the destination superblock is the TLC superblock 600. The TLC superblock 600 may be formed by the TLC memory blocks 610, 620, 630 and 640 respectively located in different memory chips.

The symbol SLC_P(k) marked on each logical page in FIG. 6 indicates that the data stored in the corresponding logical page comes from the page assigned with the page address Page_add=k in the SLC superblock 200. In FIG. 6, k=0~(N−1). It should be noted that since the capacity of a TLC superblock can be three times the capacity of an SLC superblock, the number of the source superblock in the predetermined procedure may be greater than 1. When the number of the source superblock is greater than 1, the parameter k utilized in FIG. 6 may be converted to the page address of the corresponding SLC superblock by performing some adequate calculation, for example, subtracting a predetermined value from the parameter k. Those of ordinary skill in the art can understand the implementation of such conversion, thus is omitted here for brevity.

As shown in FIG. 6, the order (for example, the aforementioned predetermined order) of the data that finally presented in the destination superblock and the order (for example, the aforementioned second order) of the page addresses assigned to the destination superblock are different. The memory controller 110 may buffer the data read the from the source superblock in the buffer memory 116, rearrange the data as the order shown in FIG. 6, and then write the rearranged data in the destination superblock. On the other hand, the memory controller 110 may also directly read the data from the source superblock based on the order shown in FIG. 6, and then sequentially write the data in the destination superblock.

In addition to the above-mentioned embodiments, another embodiment, which can make the data stored in two adjacent logical pages of the source superblock to be written in two memory blocks located in different memory chips in the destination superblock, is also provided.

According to the second embodiment of the invention, the memory controller 110 may directly change the order of assigning the page addresses to the destination superblock (or, the order or arrangement of the page addresses of the destination superblock, or the sequence of page addresses of the destination superblock recognized by the memory controller 110) to make the order or sequence of the page addresses of the destination superblock to be the same as the order or sequence of the data that has to be finally presented in the destination superblock. For example, the memory controller 110 may assign the page addresses to the destination superblock according to the second rule, for the page addresses of the destination superblock being arranged in a second order. However, in the second embodiment, the second rule is different from the first rule. In other words, in the second embodiment of the invention, the first rule is to assign the page addresses to the corresponding logical pages according to the default page indices, such that the page address is sequentially assigned to the corresponding logical page in an ascending manner as the value of the default page index increases. However, the second rule is different from the first rule. The second rule is to assign the page addresses to the corresponding logical pages based on the order of the data that has to be finally presented in the destination superblock.

Figure 7:
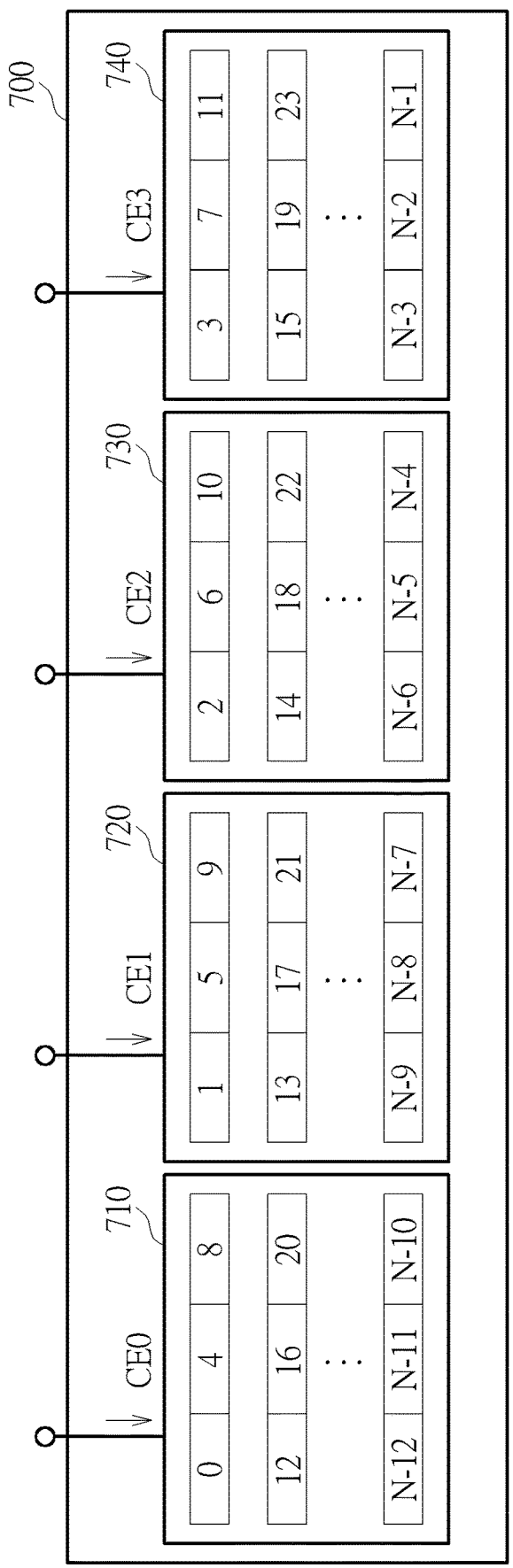
FIG. 7 shows an exemplary TLC superblock according to another embodiment of the invention.

FIG. 7 shows an exemplary TLC superblock according to another embodiment of the invention. In this embodiment, the TLC superblock 700 may be formed by the TLC memory blocks 710, 720, 730 and 740 located in different memory chips. As shown in FIG. 7, each TLC memory block may comprise a plurality of logical pages L_Page. Each logical page is marked with a number, which is the corresponding page address Page_add of that logical page.

In this embodiment, the memory controller 110 does not sequentially assign the page addresses to the corresponding logical pages based on the default page indices for the page addresses being assigned in an ascending manner to the corresponding logical pages as the value of the default page index increases. Instead, the memory controller 110 assigns the page addresses to the corresponding logical pages based on the order of the data that has to be finally presented in the destination superblock. When performing the predetermined procedure, the memory controller 110 may directly write the data in the destination superblock according to the sequence of the page addresses, and finally the data arrangement as shown in FIG. 6 can be obtained.

For example, in the second embodiment of the invention, the memory controller 110 may sequentially read the data from the source superblock according to the aforementioned first order (the order that the page addresses of the source superblock is arranged) and write the data in the destination superblock according to the aforementioned second order (the order that the page addresses of the destination superblock are arranged). Since the page addresses of the destination superblock have been arranged according to the order of the data that has to be presented in the destination superblock, the memory controller 110 only has to write the data into the corresponding logical pages of the destination superblock according to the sequence of the page addresses.

In other words, in the second embodiment of the invention, when moving the data from the source superblock to the destination superblock, the memory controller 110 may write the data to the logical pages corresponding to the destination superblock according to the predetermined order, and the predetermined order is the same as the order (that is, the aforementioned second order) that the page addresses of the destination superblock are arranged. In this manner, the same result of writing the data stored in two adjacent logical pages of the source superblock in the logical pages of two memory blocks located in different memory chips in the destination superblock can also be obtained.

Figure 8:
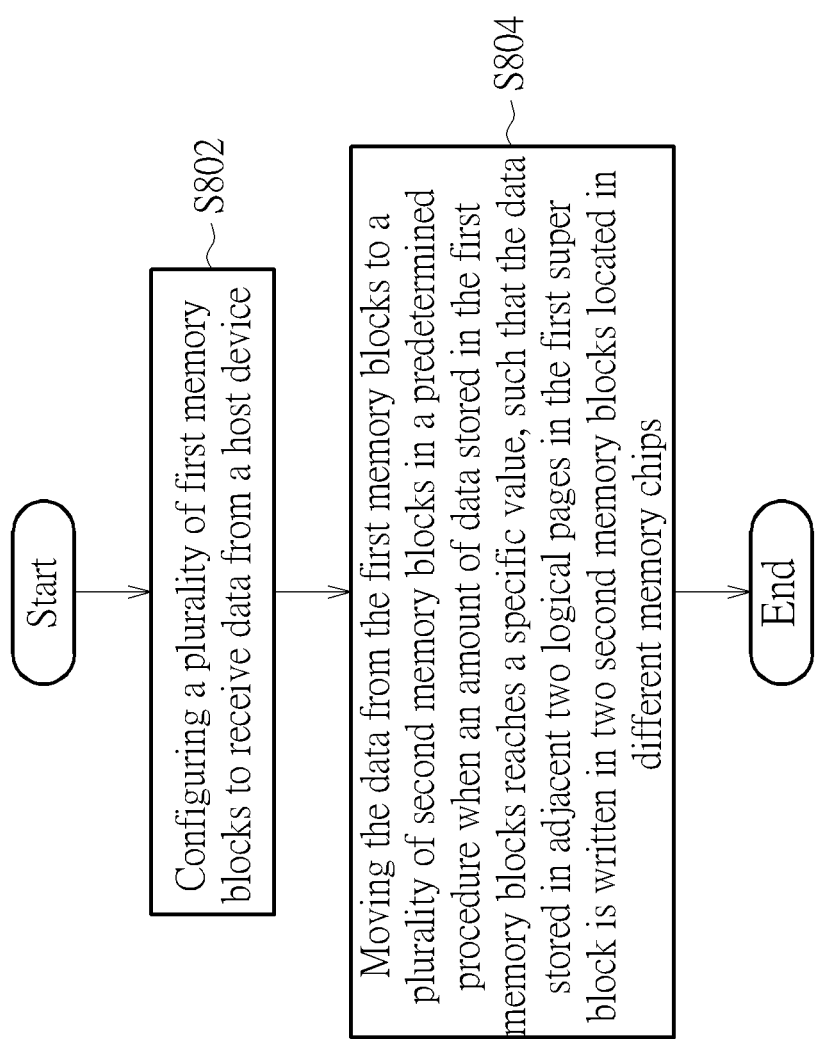
FIG. 8 shows an exemplary flow chart of a data processing method according to an embodiment of the invention.

FIG. 8 shows an exemplary flow chart of a data processing method according to an embodiment of the invention. The proposed data processing method may be performed by the memory controller 110 and may comprise the following steps:

Step S802: Configuring a plurality of first memory blocks to receive data from a host device, wherein the first memory blocks form at least a first superblock and the first superblock comprises a first predetermined number of first memory blocks located in different memory chips. For example but not for limitation, the first predetermined number may be set to 4.

Step S804: When an amount of data stored in the first memory blocks reaches a specific value, moving the data from the first memory blocks to a plurality of second memory blocks in a predetermined procedure, wherein the second memory blocks form at least a second superblock and the second superblock comprises a second predetermined number of second memory blocks located in different memory chips. For example but not for limitation, the second predetermined number may be set to 4.

It should be noted that the memory controller 110 may perform step S804 based on the first or second embodiment as discussed above, so as to make the data stored in two adjacent logical pages in the first superblock being written in two second memory blocks located in different memory chips, or, make the data stored in two logical pages in the first superblock with consecutive page addresses being written in two second memory blocks located in different memory chips.

In addition, it should be noted that the purpose of making the data stored in two adjacent logical pages in the first superblock being written in two second memory blocks located in different memory chips, or making the data in the second superblock (the destination superblock) to be arranged as the order shown in FIG. 6 is that, after the aforementioned operations, when the memory controller 110 has to read data from the second superblock, the read interleaving can be applied. Therefore, the memory access efficiency can be greatly improved.

It should be noted that the data order shown in FIG. 6 is merely an example, and the invention is not limited to arrange the data in the second superblock (the destination superblock) as the way shown in FIG. 6. As long as the data to be written into the destination superblock can be arranged in the order, which facilitates the memory controller 110 being able to use the way of read interleaving in the future to read the data, by either changing the order of the data read from the source superblock (the source data) or arranging the page addresses of the destination superblock, the memory controller 110 can certainly use other order that is different the one shown in FIG. 6 to arrange the source data or to arrange the page addresses in the destination memory block.

In addition, as discussed above, the invention is not limited to be applied in the application of moving data from the SLC memory block to the TLC memory block, and may be applied in any type of applications in which the number of data bits stored in a memory unit of the destination memory blocks is greater than or equal to the number of data bits stored in a memory unit of the source memory blocks. Those of ordinary skill in the art will readily observe numerous modifications and alterations based on the first or second embodiment of the invention and apply the proposed method in other type of data movement. Therefore, the details when the proposed method is applied in other type of data movement are omitted here for brevity.

In addition, in the embodiments discussed above, the single channel memory controller is taken as an example, but the invention is not limited thereto. The proposed data processing concept and method can also be applied to a multi-channel memory controller, where one channel corresponds to one data bus For example, suppose that the memory controller is a dual-channel memory controller. Take the SLC superblock comprising four SLC memory blocks shown in FIG. 2 as an example, the SLC memory blocks 210 and 230 may be coupled to a first channel and the SLC memory blocks 220 and 240 may be coupled to a second channel. Similarly, take the TLC superblock comprising four TLC memory blocks shown in FIG. 6 as an example, the TLC memory blocks 610 and 630 may be coupled to a first channel and the TLC memory blocks 620 and 640 may be coupled to a second channel. By writing the data stored in two adjacent logical pages of the source superblock in two logical pages of two memory blocks located in different memory chips and coupled to different channels in the destination superblock, the access efficiency can be further improved. For example, as shown in FIG. 6, since the data SLC_P(0) and SLC_P(1) are respectively written in the memory block 610 coupled to the first channel and the memory block 620 coupled to the second channel, when writing and reading data, greater parallel processing benefits can be gained.

Figure 9:
FIG. 9 is another timing diagram showing the write interleaving of the flash memory device in a dual channel structure according to an embodiment of the invention.

FIG. 9 is another timing diagram showing the write interleaving of the flash memory device in a dual-channel structure according to an embodiment of the invention. In this embodiment, four memory blocks located in different flash memory chips (in this example called first chip, second chip, third chip and fourth chip) form a superblock. The first chip and the third chip may be coupled to the memory controller 110 through the shared data bus BUS_1, and the second chip and the fourth chip may be coupled to the memory controller 110 through the shared data bus BUS_2.

The write operations of the first chip, the second chip, the third chip and the fourth chip are respectively shown in FIG. 9, wherein the time interval labeled PGM_CMD represents the time interval during which the memory controller 110 issues a write command through the data bus BUS_1 or BUS_2 to the corresponding chip to inform the corresponding chip that the memory controller 110 wants to write data, the time interval labeled DATA represents the time interval during which the memory controller 110 provides the data to be written to the corresponding chip through the data bus BUS_1 or BUS_2, and the time interval labeled BUSY represents the time interval during which the corresponding chip is busy in performing the data write operations. Since the write commands and the data are both provided to the corresponding chips through the data bus BUS_1 or BUS_2, the commands and data actually transmitted on the data bus BUS_1 and BUS_2 are also shown in FIG. 9. Compared to the single channel embodiment shown in FIG. 3, as shown in FIG. 9, by configuring dual channels, the write efficiency can be further improved.

Figure 10:
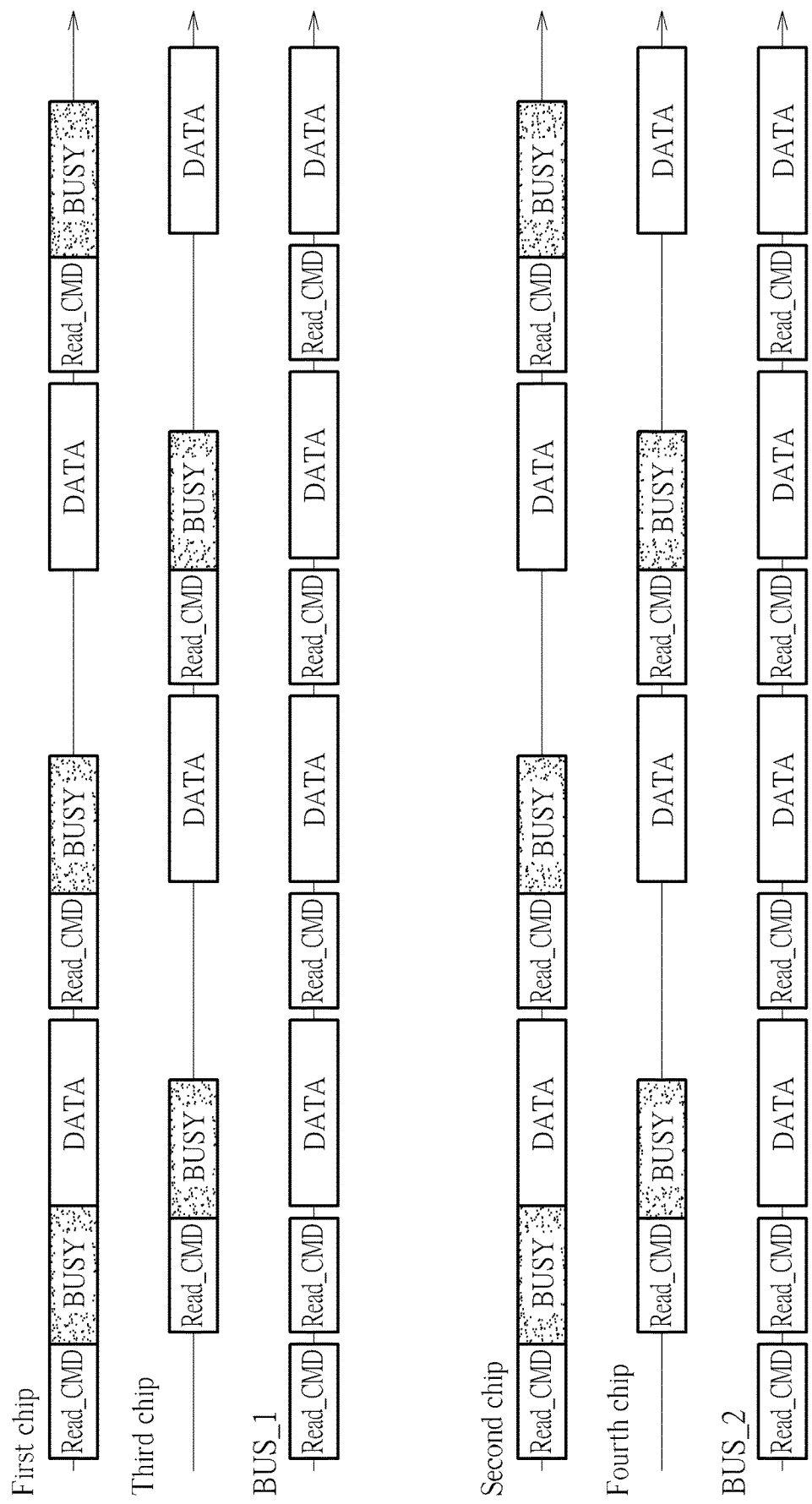
FIG. 10 is another timing diagram showing the read interleaving of the flash memory device in a dual channel structure according to an embodiment of the invention.

FIG. 10 is another timing diagram showing the read interleaving of the flash memory device in a dual channel structure according to an embodiment of the invention. Similarly, in this embodiment, the first chip and the third chip may be coupled to the memory controller 110 through the shared data bus BUS_1, and the second chip and the fourth chip may be coupled to the memory controller 110 through the shared data bus BUS_2. The read operations of the first chip, the second chip, the third chip and the fourth chip are respectively shown in FIG. 10, wherein the time interval labeled Read_CMD represents the time interval during which the memory controller 110 issues a read command through the data bus BUS_1 or BUS_2 to the corresponding chip to inform the corresponding chip that the memory controller 110 wants to read data, the time interval labeled BUSY represents the time interval during which the corresponding chip is preparing the data that the memory controller 110 wants to read. For example, the corresponding chip may retrieve the data according to the read address and store the retrieved data in its internal buffer. Therefore, during this time interval, the memory chip is busy. The time interval labeled DATA represents the time interval during which the corresponding chip is providing the data to the memory controller 110 through the data bus BUS_1 or BUS_2. Since the read commands and the data are both provided through the data bus BUS_1 or BUS_2, the commands and data actually transmitted on the data bus BUS_1 and BUS_2 are also shown in FIG. 10. Compared to the single channel embodiment shown in FIG. 4, as shown in FIG. 10, by configuring dual channels, the read efficiency can be further improved.

As discussed above, according to an embodiment of the invention, when performing a procedure of moving data, the memory controller may write the data stored in two adjacent logical pages in the source superblock in two memory blocks located in different memory chips in the destination superblock. Moreover, in the applications having the multi-channel memory controller, the memory controller may write the data stored in two adjacent logical pages in the source superblock in two memory blocks in the destination superblock which are located in different memory chips and coupled to different channels. By changing the arrangement of the data (i.e. the source data) read from the source superblock, or by adequately arranging the page addresses of the destination superblock, the data stored in two adjacent logical pages in the source superblock will be finally written in the logical page of two memory blocks located in different memory chips in the destination superblock or in the logical page of two memory blocks in the destination superblock which are located in different memory chips and coupled to different channels. With such arrangement, when the memory controller has to read data from the destination superblock in the future, the memory controller 110 is able to read the data in the way of read interleaving. In this manner, parallel processing benefits can be gained and thus the memory access efficiency can be greatly improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A data storage device, comprising:
a memory device, comprising a plurality of memory chips and each memory chip comprising a plurality of memory blocks; and
a memory controller, coupled to the memory device and arranged to access the memory device, wherein the memory controller is further arranged to configure a plurality of first memory block to receive data from a host device, the first memory blocks form at least a first superblock, the first superblock comprises a first predetermined number of first memory blocks located in different memory chips,
wherein the first superblock corresponds to a plurality of logical pages, each logical page of the first superblock is assigned a corresponding page address according to a first rule for the page addresses of the first superblock being arranged in a first order, and when receiving data from the host device, the memory controller is further arranged to sequentially write the data to the corresponding logical pages based on the first order, wherein when an amount of data stored in the first memory blocks reaches a specific value, the memory controller is arranged to move the data from the first memory blocks to a plurality of second memory blocks in a predetermined procedure, wherein the second memory blocks form at least a second superblock and the second superblock comprises a second predetermined number of second memory blocks located in different memory chips, and in the predetermined procedure, the data stored in the first memory blocks is sequentially written into the second memory blocks, wherein the data stored in two adjacent logical pages in the first superblock is written in two second memory blocks located in different memory chips.

2. The data storage device of claim 1, wherein the second superblock corresponds to a plurality of logical pages, each logical page of the second superblock is assigned a corresponding page address according to a second rule for the page addresses of the second superblock being arranged in a second order, and wherein the first rule is the same as the second rule.

3. The data storage device of claim 2, wherein when moving the data from the first memory blocks to the second memory blocks, the memory controller is arranged to sequentially read the data from the logical pages corresponding to the first superblock according to the page addresses of the first superblock and write the data in the logical pages corresponding to the second superblock according to a predetermined order, and wherein the predetermined order is different from the second order.

4. The data storage device of claim 1, wherein consecutive page addresses are assigned to two adjacent logical pages in the first superblock.

5. The data storage device of claim 1, wherein the second superblock corresponds to a plurality of logical pages, each logical page of the second superblock is assigned a corresponding page address according to a second rule for the page addresses of the second superblock being arranged in a second order, and wherein the first rule is different from the second rule.

6. The data storage device of claim 5, wherein when moving the data from the first memory blocks to the second memory blocks, the memory controller is arranged to sequentially read the data from the logical pages corresponding to the first superblock according to the page addresses of the first superblock and write the data in the logical pages corresponding to the second superblock according to a predetermined order, and wherein the predetermined order is the same as the second order.

7. The data storage device of claim 1, wherein the first memory blocks are a plurality of Single-Level Cell (SLC) memory blocks, the second memory blocks are a plurality of Multiple-Level Cell (MLC) memory blocks, Triple-Level Cell (TLC) memory blocks or Quad-Level Cell (QLC) memory blocks.

8. The data storage device of claim 1, wherein a number of data bits stored in a memory unit of the second memory blocks is greater than or equal to a number of data bits stored in a memory unit of the first memory blocks.

9. A data processing method for a memory device comprising a plurality of memory chips and each memory chip comprising a plurality of memory blocks comprising:

configuring a plurality of first memory blocks to receive data from a host device, wherein the first memory blocks form at least a first superblock and the first superblock comprises a first predetermined number of first memory blocks located in different memory chips, wherein the first superblock corresponds to a plurality of logical pages, each logical page of the first superblock is assigned a corresponding page address according to a first rule for the page addresses of the first superblock being arranged in a first order, and when receiving data from the host device, the data is sequentially written to the corresponding logical pages based on the first order; and when an amount of data stored in the first memory blocks reaches a specific value, moving the data from the first memory blocks to a plurality of second memory blocks in a predetermined procedure, wherein the second memory blocks form at least a second superblock and the second superblock comprises a second predetermined number of second memory blocks located in different memory chips, and wherein the data stored in two logical pages in the first superblock with consecutive page addresses is written in two second memory blocks located in different memory chips.

10. The data processing method of claim 9, wherein the second superblock corresponds to a plurality of logical pages, each logical page of the second superblock is assigned a corresponding page address according to a second rule for the page addresses of the second superblock being arranged in a second order, and wherein the first rule is the same as the second rule.

11. The data processing method of claim 10, wherein the step of moving the data from the first memory blocks to the second memory blocks further comprises:

sequentially reading the data from the logical pages corresponding to the first superblock according to the page addresses of the first superblock; and writing the data in the logical pages corresponding to the second superblock according to a predetermined order, wherein the predetermined order is different from the second order.

12. The data processing method of claim 9, wherein the second superblock corresponds to a plurality of logical pages, each logical page of the second superblock is assigned a corresponding page address according to a second rule for the page addresses of the second superblock being arranged in a second order, and wherein the first rule is different from the second rule.

13. The data processing method of claim 12, wherein the step of moving the data from the first memory blocks to the second memory blocks further comprises:

sequentially reading the data from the logical pages corresponding to the first superblock according to the page addresses of the first superblock; and writing the data in the logical pages corresponding to the second superblock according to a predetermined order, wherein the predetermined order is the same as the second order.

* * * * *